United States Patent [19]

Bergk

[11] Patent Number: 5,479,330
[45] Date of Patent: Dec. 26, 1995

[54] ELECTRONIC SWITCH NETWORK PART FOR SUPPLYING CURRENT TO AN ACCUMULATOR WITH A BLOCKING OSCILLATOR TYPE CONVERTER

[75] Inventor: Günther Bergk, Niedernhausen, Germany

[73] Assignee: Braun Aktiengesellschaft, Kronberg, Germany

[21] Appl. No.: 175,406

[22] PCT Filed: Jun. 20, 1992

[86] PCT No.: PCT/DE92/00513

§ 371 Date: Jan. 6, 1994

§ 102(e) Date: Jan. 6, 1994

[87] PCT Pub. No.: WO93/01642

PCT Pub. Date: Jan. 21, 1993

[30] Foreign Application Priority Data

Jul. 8, 1991 [DE] Germany ............ 41 22 544.9

[51] Int. Cl.⁶ .................... H02M 3/335; H02J 7/04
[52] U.S. Cl. ............... 363/19; 320/32; 320/39
[58] Field of Search ................. 363/15, 16, 18, 363/19, 20, 21; 323/222, 282, 290; 320/30, 32, 39, 40

[56] References Cited

U.S. PATENT DOCUMENTS

| | | | |
|---|---|---|---|
| 4,376,263 | 3/1983 | Pittroff et al. | 320/32 |
| 4,426,612 | 1/1984 | Wicnienski et al. | 320/39 |
| 4,464,619 | 8/1984 | Schwarz et al. | 320/40 |
| 4,523,139 | 6/1985 | Schwarz et al. | 320/40 |
| 4,706,009 | 11/1987 | Schwarz | 320/22 |
| 4,763,061 | 8/1988 | Schwarz | 363/19 |
| 4,965,506 | 6/1990 | Algra et al. | 320/23 |
| 5,239,459 | 8/1993 | Remson | 363/19 |
| 5,390,100 | 2/1995 | Palata | 363/19 |

FOREIGN PATENT DOCUMENTS

| | | | |
|---|---|---|---|
| 0162341 | 5/1983 | European Pat. Off. | H02J 7/10 |
| 0383383 | 8/1990 | European Pat. Off. | H02J 7/02 |
| WO83/03722 | 10/1983 | WIPO | H02J 7/10 |

Primary Examiner—Matthew V. Nguyen
Attorney, Agent, or Firm—Fish & Richardson

[57] ABSTRACT

In an electronic power supply unit to power an accumulator with a blocking oscillator-type converter synchronized on the primary side, the primary winding of the transformer is connected in series with the collector-emitter path of a first transistor, the base of which is controlled by a second transistor. A flip-flop consisting of a third and fourth transistor blocks the first transistor when a predetermined upper switch-off voltage is reached at the accumulator and releases it when the switch-on voltage falls below a predetermined lower level.

9 Claims, 2 Drawing Sheets

ROCKER STAGE

ELECTRONIC SWITCH NETWORK PART FOR SUPPLYING CURRENT TO AN ACCUMULATOR WITH A BLOCKING OSCILLATOR TYPE CONVERTER

The invention relates to an electronic switch network part for supplying current to an accumulator from an alternating or direct current source with a primary beat blocking converter which contains a transmitter whose secondary winding is connected in series with the accumulator and a first diode and whose primary winding is connected in series with the collector-emitter path of a first transistor whose base is both attached to one end of the secondary winding of the transmitter by a regenerative resistance and a regenerative capacitor wherein the other end of the winding is connected to the accumulator, and also is connected by a first resistance to one pole of the input voltage source and to the collector of a second transistor whose emitter is placed on the mass potential wherein the emitter of the first transistor is both connected with the mass potential by a second resistance and accumulator and also attached to the base of the second transistor by a zener diode wherein a rocker stage is provided which blocks the first transistor on reaching a predetermined upper switch-off voltage at the accumulator and releases same when understepping a predetermined lower switch-on voltage.

BACKGROUND OF THE INVENTION

A circuit arrangement of this kind is known from EP 0 162 341. Switching off when reaching a certain accumulator voltage is carried out there by means of a rocker stage formed from the second and third transistors. As soon as the set ideal voltage is reached the first transistor which is designed as a switch transistor is blocked and is released again immediately the ideal voltage is understepped. With this known circuit arrangement after the start of charging the charging current decreases comparatively rapidly with an empty accumulator (cf FIG. 3).

From EP 0 383 383 A1 there is known an electronic switch. network part for supplying current to an accumulator with parallel-connectable direct current motor from an alternating or direct current source with a primary beat blocking converter which contains a transmitter whose primary winding is connected in series with a first transistor and a first resistance. The secondary winding of the transmitter lies in series with a diode and the accumulator and is connected to the base of the first transistor by the series connection of a second resistance and a capacitor. A circuit is provided to change from rapid charging to constant charging on reaching a predetermined accumulator voltage and to feed the direct current motor with constant voltage independent of the charge. This circuit contains a voltage divider connected to the emitter of the first transistor and having two series connected resistances and a second transistor whose base is attached to the connection of the second resistance with the capacitor.

SUMMARY OF THE INVENTION

The object of the invention is now to design a circuit arrangement of the kind mentioned at the beginning so that a rapid charging of the accumulator can take place in a much shorter time (for example about 30 minutes instead of about 60 minutes charging time from empty accumulator to practically full accumulator) without increasing to an inadmissible level the constant charging current which flows after complete charging.

BRIEF DESCRIPTION OF THE DRAWING

The invention will now be explained in further detail with reference to the embodiments shown in the drawings in which.

The switch-off characteristic line is hereby a function of the charging current in dependence on the charging time of an empty accumulator.

DESCRIPTION OF PARTICULAR EMBODIMENT

Figure 1:
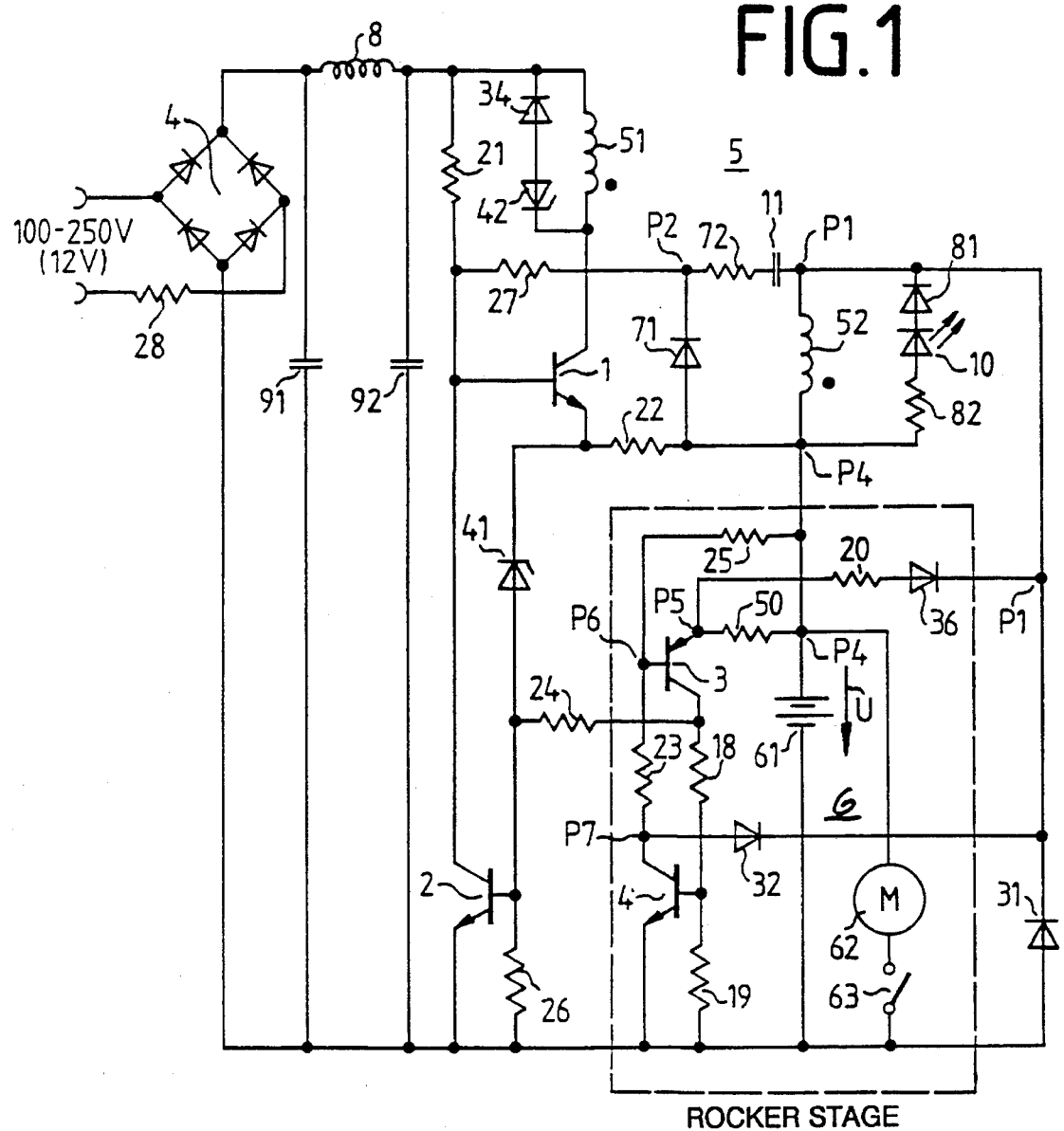
FIG. 1 shows an embodiment of the invention.

FIG. 1 illustrates an electronic switch network part which consists of a primary beat blocking converter with a transmitter 5 and a first transistor 1 as well as a first diode 31 provided in the charging circuit. The blocking converter is fed by a rectifier bridging circuit 4 and a resistance 28 from a direct or alternating voltage network whose voltage can be between 100 and 250 volts, in extreme cases however also 12 volts, and whose frequency can be practically anywhere in the case of a charging alternating voltage network. The rectified output voltage is connected to the input of the blocking converter or control and regulating electronics by a screen and smoothing arrangement consisting of a longitudinal throttle 8 and two smoothing capacitors 91, 92.

The series connection of the primary winding 51 of the transmitter 5 with the collector-emitter path of the first transistor 1, a second resistance 22 and an accumulator 61 is connected parallel to the direct voltage terminals. A first resistance 21 connected by the longitudinal throttle 8 to the positive pole of the input voltage terminal is attached to the base of the first transistor 1. Furthermore the base of the first transistor 1 is connected by the collector-emitter path of a second transistor 2 to the mass or reference potential. The emitter of the first transistor 1 is attached to the cathode of a zener diode 41 whose anode is connected both to the base of the second transistor 2 and by a resistance 26 to the mass or reference potential. Furthermore the emitter of the first transistor 1 is attached by the second resistance 22 to one winding end (P4) of the secondary winding 52 of the transmitter 5. The winding sense of the primary and secondary windings of the transmitter 5 is shown by the dots.

A regenerative capacitor 11 is connected by a regenerative resistance 27 to the base of the first transistor 1 and directly to one winding end (P1) of the secondary winding 52 of the transmitter 5. The consumer unit 6 consisting of the parallel circuit of the accumulator 61 with the series connection of a switch 63 and direct current motor 62 is attached to the other winding end (P4) of the secondary winding 52.

The cathode of the first diode 31 mounted in the charging circuit is placed at the one winding end (P1) of the secondary winding 52 and the anode at the end of the accumulator 61 connected to the reference potential.

The regenerative capacitor 11 is additionally connected by a current restrictor resistance 72 to a discharge diode 71 whose cathode faces the regenerative capacitor 11 (P2) and whose anode is connected to the plus pole (P4) of the accumulator 61. The series connection of a protection diode 81, light diode 10 and current restrictor resistance 82 is connected in parallel with the secondary winding 52 between P1 and P4.

The series connection of a voltage divider 25/23 and the collector-emitter path of a fourth transistor 4 lies parallel with the accumulator 61. The base of a third transistor 3 is placed at the connection point (P6) of the resistances 25 and 23 of this voltage divider.

The series connection of a third diode 36 and a voltage divider 20/50 is arranged between the one winding end (P1) of the secondary winding 52 and the plus pole (P4) of the accumulator 61. The emitter of the third transistor 3 lies at the connecting point (P5) of the resistances 20 and 50.

The collector of the third transistor 3 is connected both by a resistance 24 with the base of the second transistor 2 and by a resistance 18 with the base of the fourth transistor 4. The base of the fourth transistor 4 is connected by a resistance 19 with the reference potential. A second diode 32 is inserted between the collector connection (P7) of the fourth transistor 4 and the one winding end (P1) of the secondary winding 52 wherein the anode connection of this second diode 32 is connected with the collector connection.

In order to restrict the regenerative voltage a circuit is provided parallel to the primary winding 51 of the transmitter 5 and consists of the series connection of a zener diode 42 with a diode 34 which are connected together on the anode side.

The functioning of the circuit arrangement will now be explained in further detail according to FIG. 1.

After rectification by means of the rectifier bridging circuit 4 and screening and smoothing by means of the longitudinal throttle 8 and smoothing capacitors 91, 92 respectively, the first transistor 1 which works as a switching transistor is controlled with a low base current by the first resistance 21. As a result of the first transistor 1 switching on a co-coupling effect is produced through the switching path of the first transistor 1 and the primary winding 51 of the transmitter 5 whereby the first transistor 1 is additionally controlled and switched into the conductive state. The collector current rises linearly and produces a proportional voltage at the second resistance 22. On reaching a certain peak current value the second transistor 2 is controlled through the zener diode 41, thereby passes into the conductive state and connects the base of the first transistor 1 with the reference potential or mass and thus draws the base current from the first transistor 1 whereupon the first transistor 1 blocks. At the beginning of the blocking phase the polarity of the voltage induced in the secondary winding 52 of the transmitter 5 at the connection point P1 of the regenerative capacitor 11 changes. The energy stored in the transmitter 5 is thus sent to the consumer unit 6 through the first diode 31 according to the principle of a blocking converter.

During the oscillating process of the transmitter 5 the diode 43 and the zener diode 42 parallel to the primary winding 51 of the transmitter 5 restrict the recoil voltage peak during the blocking phase.

Since during the entire transmitter discharge phase there is a negative potential at the point P1 of the secondary winding 52, during this time the point P7, that is the connecting point of the resistance 23 with the collector of the fourth transistor 4 is placed by the second diode 32 on the reference potential (assuming the same threshold voltage of the diodes 31 and 32). The voltage divider 25/33 is thereby dimensioned so that during this current flow phase in the secondary circuit the third transistor 3 whose base lies at the point P6 of the voltage divider and whose emitter is connected with the plus pole (P4) of the accumulator 61 through the resistance 50, becomes conductive just near the switch-off voltage of the accumulator 61. Premature over-control of the third transistor 3 is hereby avoided which in connection with the hysteresis properties of the circuit, which will be explained later, leads to a clearly distinct switch-off characteristic line (cf FIGS. 3 and 4). Through the conductive transistor 3 the second transistor 2 also becomes conductive through the resistance 24 and thus the first transistor 1 is kept blocked.

In the conductive state of the first transistor 1 the regenerative capacitor 11 would be charged by the regenerative resistance 27 whereby a negative polarity would form at the point P2 of the regenerative capacitor 11. This charging with negative polarity at the point P2 flows during the transmitter discharge phase through the discharge diode 71 to the plus pole of the accumulator 61 so that even with a low input voltage (eg 12 volts) the first transistor 1 can switch through comparatively rapidly at the end of the discharge phase, that is the switch network part can again easily oscillate. The current restrictor resistance 72 lying between the connection point P2 of the cathode of the discharge diode 71 with the regenerative branch (11, 27) and the capacitor 11 serves to restrict the current through the discharge diode 71. This current restrictor resistance 72 can also be inserted between the anode of the discharge diode 71 and its connection with the point P4.

The light diode (LED) 10 lights up during the transmitter discharge phase since during this time the potential at the winding end P4 of the secondary winding 52 is positive compared to the potential at the winding end P1. The resistance 82 is a current restrictor resistance. The diode 81 serves to protect the LED from too much voltage during the switch-through phase of the first transistor T1 when positive potential arises at the point P1.

As described above, the foot point (P7) of the voltage divider 25/23 during the transmitter discharge phase lies on the reference potential and the third transistor 3 is conductive near the switch-off voltage of the accumulator 61. The resistance 25, or a part of same, is designed adjustable for balancing. The resistance 23, or a part of same, is dependent on temperature in order to copy the voltage path of the accumulator 61 in dependence on the temperature.

It is now important that during this current flow phase in the secondary circuit the voltage value of the switch-off point Ab of the accumulator voltage U (cf FIG. 2) is raised by the voltage divider 50/20 arranged between the plus pole (P4) of the accumulator 61 and the point P1. The emitter of the third transistor 3 is placed at the connecting point P5 of the resistances 50 and 20 whereby the resistance 50 lies between the plus pole (P4) and the emitter, and the resistance 20 lies between the emitter and the point P1. The third diode 36 inserted between the resistance 20 and the point P1 serves for uncoupling during the flow phase of the first transistor 1, that is when a positive potential prevails at the point P1.

Through this voltage divider 50/20 the switch-off voltage is raised during the transmitter discharge phase by about the value (R50:R20)×U (the resistance 50 is hereby negligible since it is very small against the resistance 20), wherein R50 is the value of the resistance 50 and R20 the value of the resistance 20.

The exact value of the switch-off voltage $U_a$ is $$U_a = U_{CE4} + \frac{R25 + R23}{R25} [U_{BE3} + (I_{C3} + I_{R20})R50] \quad (1)$$

$U_{CE4}$ is hereby the collector-emitter voltage of the switched-through fourth transistor 4, $U_{BE3}$ the base emitter voltage of the switched-through third transistor 3, $I_{C3}$ the collector current of the third transistor 3, I R20 the current flowing through the resistance 20, and R23, R25, R50 the values of the resistances 23, 25, 50. It is thereby presumed that the first, second, and third diodes 31, 32 and 36 have the same transmission voltage so that reference potential adjoins the point P7 and the connecting point between the resistance 20 and the third diode 36.

If at the end of the transmitter discharge phase the accumulator voltage U has still not yet reached the switch-off voltage $U_a$ predetermined according to the equation, the third transistor 3 and thus also the fourth transistor 4 is blocked, that is the comparator formed from the transistors 3 and 4 rocks back into the blocking state. Since the third transistor 3 is blocked, the second transistor 2 is likewise blocked so that the first transistor 1 is released for a new switch-on process.

If however the accumulator voltage U reaches or has exceeded the value of the switch-off point (switch-off voltage $U_a$) at the end of the transmitter-discharge phase then the third transistor 3 and thus also the second and fourth transistors 2 and 4 remain conductive, that is the comparator remains in the conductive state. The first transistor 1 cannot switch on owing to the conductive switched-on second transistor 2. The negative potential only adjoining the point P1 during the secondary current flow phase is however no longer present and thus there is no longer a voltage drop at the resistance 50 produced by the resistance 20 and the third diode 36.

Figure 2:
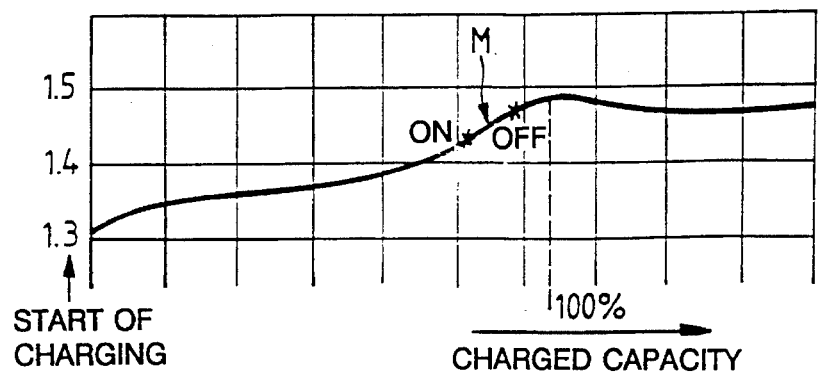
FIG. 2 shows the typical path of the cell voltage when charging an accumulator in dependence on the charged capacity.

The rocker stage (or comparator) formed from the transistors 3 and 4 then only tips back again into the blocking state and thus only releases the first transistor 1 again for a new switch-on process when the accumulator voltage U has understepped the switch-on voltage $U_e$, that is a lower voltage value on (cf FIG. 2). This lower voltage value is $$U_e = U_{CE4} + \frac{R25 + R23}{R25} [U_{BE3} + I_{C3} \times R50] \quad (2)$$

The terms of this equation (2) have the same significance as those in equation (1).

The difference between the (upper) switch-off voltage $U_a$ and the (lower) switch-on voltage $U_e$ (marked in FIG. 2 by "off" and "on" ((on)) ) represents the desired hysteresis of the rocker stage. This hysteresis can be dimensioned within wide boundaries.

The advantage of such a circuit arrangement with hysteresis of the rocker stage compared to the circuit arrangement according to EP 0 162 341 B1 (FIG. 1) whose rocker stage or comparator has no hysteresis properties will be explained in detail with reference to FIGS. 2, 3 and 4.

The off-on switching point of the comparator of the circuit arrangement according to EP 0 162 341 B1 is marked M on the curve in FIG. 2 (typical path of the accumulator voltage when charging in dependence on the charged capacity). This off-on switching voltage U M of the accumulator of the known switching arrangement lies between the switch-off voltage $U_a$ and the switch-on voltage $U_e$ of the present circuit arrangement. The voltage U M cannot be increased in any way whatsoever in a circuit arrangement without hysteresis (for example to $U_a$) since otherwise the constant charging current would be too great after fully charging the accumulator, which would damage the accumulator.

Figure 3:
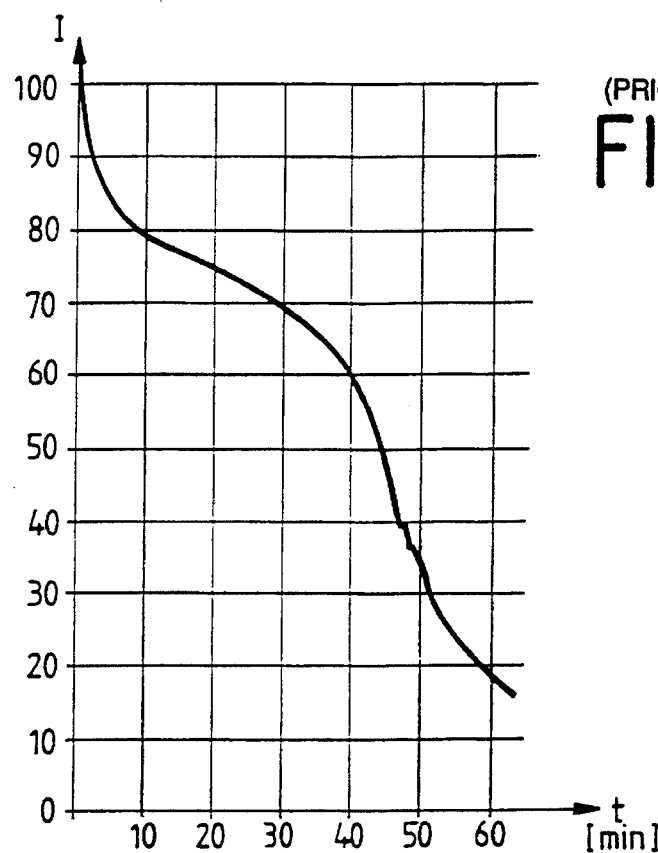
FIG. 3 shows the path of the switch-off characteristic line of an embodiment of the circuit arrangement known from EP 0 162 341 B1.
Figure 4:
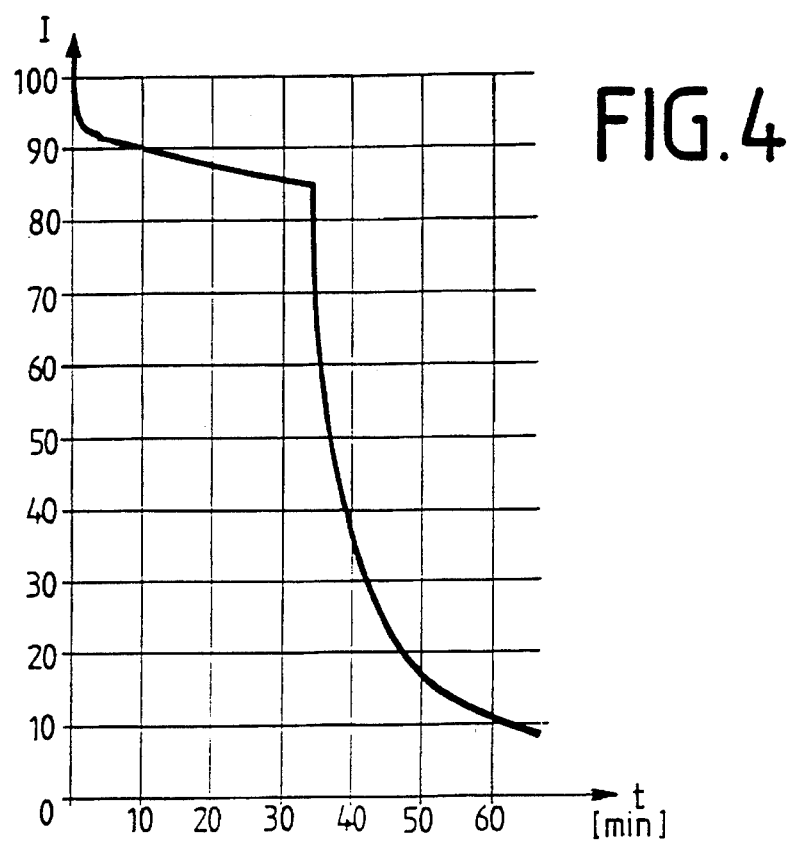
FIG. 4 shows the path of the switch-off characteristic line of an arrangement according to FIG. 1.

When compared with FIGS. 3 and 4 (typical path of the switch-off characteristic line, that is the dependence of the charging current I, given in percent of the starting current with an empty accumulator, from the charging time t) it can be seen that the charging current of the present arrangement (FIG. 4) is at a practically constant high level until the accumulator is fully charged and that full charging has already been reached after about 33 minutes (distinct bend in the switch-off characteristic line), whilst with the known arrangement (FIG. 3) the charging current already continuously decreases from the start so that here the full charging of the accumulator is only reached after about 60 minutes. The charging amount deposited in the accumulator corresponds to the integral of the charging current I over the charging time t. It can also be seen here that the charging amount deposited in the accumulator (corresponds to the surface under the curves), which is reached in FIG. 3 after 60 minutes is already reached in FIG. 4 after about 33 minutes.

It can also be seen from FIGS. 3 and 4 that despite the higher charging current of the present circuit arrangement (FIG. 4) the constant charging current after fully charging the accumulator is no higher than in the known arrangement (FIG. 3).

A further advantage of the present invention is that as a result of the adjustable hysteresis by means of the voltage divider (20/50) the light diode 10 begins to flash visibly and in defined manner on approaching the fully charged state of the accumulator.

It should be noted that the hysteresis of the rocker stage formed from the transistors 3 and 4 is not dependent on the internal recoil couplings but on the changing potential at the point P1 of the blocking converter.

We claim:

1. Electronic switch network part for supplying current to an accumulator (61) from an alternating or direct current input source with a primary beat blocking converter which contains a transmitter (5) whose secondary winding (52) is connected in series with the accumulator (61) and a first diode (31) and whose primary winding (51) is connected in series with a collector-emitter path of a first transistor (1) whose base is attached to one end (P1) of the secondary winding (52) of the transmitter (5) by a regenerative resistance (27) and a regenerative capacitor (11) wherein the other end (P4) of the secondary winding is connected to the accumulator (61), and the first transistor base also is connected by a first resistance (21) to one pole of the input source and to a collector of a second transistor (2) whose emitter is placed on a reference potential wherein an emitter of the first transistor (1) is connected with the reference potential by a second resistance (22) and the accumulator (61) and also attached to a base of the second transistor (2) by a zener diode (41) wherein a rocker stage is provided which blocks the first transistor (1) on reaching a predetermined upper switch-off voltage ($U_a$) at the accumulator (61) and releases same when understepping a predetermined lower switch-on voltage ($U_e$), characterized in that the rocker stage consists of a third transistor (3) and a fourth transistor (4), that an emitter of the third transistor (3) is attached (P5) to a first voltage divider (20, 50) mounted between the one end (P1) of the secondary winding (52) and the accumulator (61), that a base of the third transistor (3) is attached (P6) to a second voltage divider (25, 23) mounted between the accumulator (61) and a collector (P7) of the fourth transistor (4), that an emitter of the fourth transistor (4) is connected with the reference potential and the collector (P7) of the fourth transistor (4) is connected by a second diode (32) with the one end (P1) of the secondary winding (52) and that a collector of the third transistor (3) is coupled both with the base of the second transistor (2) and with a base of the fourth transistor (4).

2. Electronic switch network part according to claim 1 characterized in that a third diode (36) is mounted in the first voltage divider (20, 50) between the emitter (P5) of the third transistor and the one end (P1) of the secondary winding (52).

3. Electronic switch network part according to claim 1 wherein a resistance (23) of the second voltage divider (25, 23) is designed to be dependent on temperature.

4. Electronic switch network part according to claim 1 wherein a resistance (25) of the second voltage divider (25, 23) is designed to be adjustable.

5. Electronic switch network part according to claim 1 wherein one end (P2) of the regenerative capacitor (11) remote from the second winding (52) is connected with the accumulator (61) by a discharge diode (71).

6. Electronic switch network part according to claim 1 wherein a light diode (10) is connected in series with a protection diode (81) parallel to the secondary winding.

7. Electronic switch network part according to claim 2 wherein a resistance of the second voltage divider is designed to be dependent on temperature, said resistance of the second voltage divider is further designed to be adjustable.

8. Electronic switch network part according to claim 1 wherein one end (P2) of the regenerative capacitor remote from the second winding is connected with the accumulator by a discharge diode; and a light diode is connected in series with a protection diode parallel to the secondary winding.

9. Electronic switch network part according to claim 8 wherein a resistance of the second voltage divider is designed to be dependent on temperature, said resistance of the second voltage divider is further designed to be adjustable.

* * * * *